United States Patent [19]

Abdow

[11] Patent Number: 5,432,302
[45] Date of Patent: Jul. 11, 1995

[54] HYDROSTATIC SEALING SLEEVE FOR SPLICED WIRE CONNECTIONS

[75] Inventor: David A. Abdow, Somerset, Mass.

[73] Assignee: The United States of America as represented by the Secretary of the Navy, Washington, D.C.

[21] Appl. No.: 978,550

[22] Filed: Nov. 19, 1992

[51] Int. Cl.$^6$ .............................. H02G 15/18
[52] U.S. Cl. ..................... 174/84 R; 174/70 R
[58] Field of Search ........... 174/70 R, 77 R, 84 R, 174/84 C, 85, 91, 92, 93

[56] References Cited

U.S. PATENT DOCUMENTS

| | | | |
|---|---|---|---|
| 2,958,723 | 11/1960 | Logan et al. | 174/84 C |
| 3,065,292 | 11/1962 | Chickvary | 174/84 C |
| 3,525,799 | 8/1970 | Ellis | 174/84 R |
| 3,553,631 | 1/1971 | Shlesinger, Jr. | 174/84 R |
| 3,770,876 | 11/1973 | Post | 174/84 R X |
| 3,823,254 | 7/1974 | Smith | 174/92 |

*Primary Examiner*—Peter Dungba Vo
*Attorney, Agent, or Firm*—Michael J. McGowan; Prithvi C. Lall; Michael F. Oglo

[57] ABSTRACT

A hydrostatic sealing sleeve hydrostatically seals a spliced wire connection in high pressure underwater conditions. The sealing sleeve is fashioned from an elastomeric compound, such as neoprene, and is fitted over one end of an insulated wire that is to be spliced onto a butt wire splice. The other insulated wire is spliced together with the first wire and the sealing sleeve is then slid over the butt wire splice where it rests in a centrally located cavity inside the sleeve. The outer ends of the sealing sleeve include sealing baffles which compress onto the outer peripheral surfaces of the insulated wires, creating a high pressure water tight seal.

4 Claims, 1 Drawing Sheet

HYDROSTATIC SEALING SLEEVE FOR SPLICED WIRE CONNECTIONS

STATEMENT OF GOVERNMENT INTEREST

The invention described herein may be manufactured and used by or for the Government of the United States of America for governmental purposes without payment of any royalties thereon or therefore.

BACKGROUND OF THE INVENTION (1) Field of the Invention

The instant invention relates to splice connectors for electrical conductors and more particularly relates to a sealing sleeve for hydrostatically sealing a spliced wire connection under high pressure conditions.

(2) Description of the Prior Art

Heretofore, the existing technology for hydrostatically sealing spliced wire connections under high pressure conditions comprised enclosing the spliced connection in two mateable mechanical boots or enclosing the spliced connection in a heat shrinkable tubing. Although effective, each of these technologies has disadvantages. The available mechanical boot designs tend to be expensive and bulky compared with heat shrink tubing. However, existing heat shrink tubing requires an electrical source to power a heat gun or a high heat producing device at the location where it is necessary to activate the heat shrink tubing. The heat shrink tubing requires a considerable amount of time and space to activate it and seal the wire spliced connection. In addition, the activated heat shrink tubing usually requires visual inspection to determine that it has been fully activated. Because hydrostatic seals are often installed in very confined narrow spaces, a relatively small diameter hydrostatic seal over a spliced wire connection is often necessary. In these types of situations, mateable boots can cause the overall dimensions of the spliced assembly to be too large in diameter. On the other hand, the use of heat shrink tubing in such situations is hindered by concerns such as environmental conditions, splice accessibility, time limitation required to heat and cool the tubing, and other safety issues such as the use of a heat producing device around low flash point substances.

A variety of protective sleeves for spliced wire connection have heretofore been known in the art. For example, the U.S. Pat. Nos. 433,922 to Wiley et al; 2,997,522 to Schneider; 3,009,986 to Stephens; 3,243,500 to Rabinowitz; 3,692,922 to Sugimoto et al and 3,895,180 to Plummer represent the closest prior art to the subject invention of which the applicant is aware. Generally, each of the patents discloses a connector element for joining the ends of the wires and a protective cover disposed over the connector. Most of these connectors are too bulky or complicated to install in confined spaces, and furthermore, none of the connectors are hydrostatically sealed for use in high pressure underwater applications.

The patent to Wiley et al discloses a protective splice cover comprising a plurality of concentric tubes or sleeves which are oriented over the spliced connection. The splice cover is very complicated to install and is not hydrostatically sealed, and therefore could not be utilized in underwater applications. The patent to Schneider discloses a pre-insulated connector which is adapted to receive the stripped ends of wires and to be crimped to provide a joint that has good electrical conductivity and that is substantially watertight. This connector has a substantially larger diameter than is desired for the present application. Still further, although the connector may protect the splice from rain or snow, it is not hydrostatically sealed for underwater applications. The patent to Stephens discloses a flexible sleeve which is telescopingly received over the wires to insulate and shield the splice connection. Although the flexible sleeve will protect the splice from the weather it is not hydrostatically sealed. The patent to Rabinowitz discloses a mineral filled cable connector for connecting Mineral-Insulated cable. The patent to Sugimoto et al discloses a cable joint connector comprising an inner sleeve, an outer sleeve, and an insulation sleeve which is disposed between the inner and outer sleeves. The diameter of the sleeve is considerably larger than that of the cables being connected, and the connector is not hydrostatically sealed. The patent to Plummer discloses a grease filled cable splice assembly comprising an inner cover disposed around the spliced connection, and an outer jacket surrounding the inner cover. The inner cover is filled with grease, and a liquid foam insulating material is disposed between the inner cover and the outer jacket. The splice assembly will protect the splice from the environment but it is not hydrostatically sealed.

SUMMARY OF THE INVENTION

The instant invention provides a sealing sleeve which is operable for hydrostatically sealing a butt wire spliced connection between first and second insulated wires.

Briefly, the hydrostatic sealing sleeve is a one-piece article comprising a length of elastomeric tubing having first and second ends, a uniform outside diameter, an internal cavity centrally located between the first and second ends, and a plurality of internal sealing baffles adjacent both of the first and second ends. Both internal ends of the sealing sleeve are lubricated with a silicone gel compound, and the first end of the sleeve is slid over the stripped end of the first wire to be spliced. The stripped ends of both wires are then inserted into the butt wire splice and crimped. The sealing sleeve is then slid over the crimped splice so that the splice is located in the central internal cavity. Once the splice is properly positioned, the sealing baffles compress onto the outer peripheral surface of the insulated wires to create a high pressure hydrostatic seal. The sealing sleeve is relatively inexpensive compared with heat shrinkable tubing and mateable boots, it is simple to install, and when in the proper position, the sealing sleeve has a diameter which is only slightly larger than the diameter of the wires being spliced. The sealing sleeve also provides a distinct advantage over heat shrinkable tubing in that it can be used in remote areas where it is not possible to use a heat gun, such as in underwater applications and in areas where flammable vapors are present. The sleeve is also reusable.

Accordingly, it is an object of the instant invention to provide a sealing sleeve for hydrostatically sealing a butt wire splice connection.

It is another object to provide a hydrostatic sealing sleeve which has a diameter that is only slightly larger than the diameter of the wires being spliced.

It is another object to provide a hydrostatic sealing sleeve which is simple to install, and which does not require visual inspection to determine if the seal is in the proper position.

It is still another object to provide a hydrostatic sealing sleeve which is inexpensive and reusable.

BRIEF DESCRIPTION OF THE DRAWINGS

A more complete understanding of the invention and many of the attendant advantages thereto will be readily appreciated as the same become better understood by reference to the following detailed description when considered in conjunction with the accompanying drawings wherein.

DESCRIPTION OF THE PREFERRED EMBODIMENT

Figure 1:
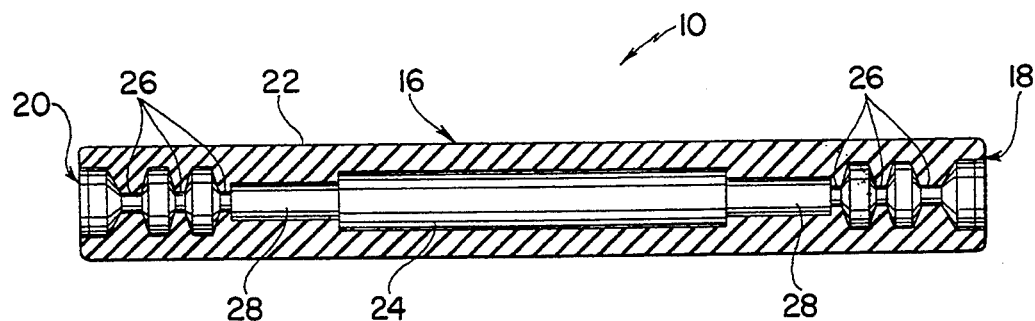
FIG. 1 is a cross sectional view of the hydrostatic sealing sleeve of the instant invention.
Figure 2:
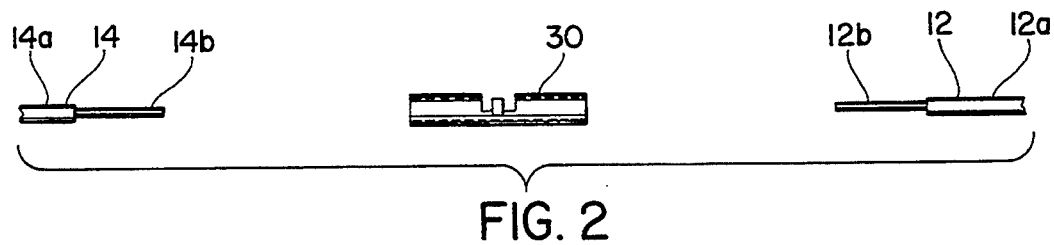
FIG. 2 is an exploded view of a butt wire splice connector and the ends of two wire segments which are to be spliced together.

Referring now to the drawings, and particularly to FIG. 1, the hydrostatic sealing sleeve of the instant invention is illustrated and is generally indicated at 10. The sealing sleeve 10 is operable for hydrostatically sealing a spliced wire connection between first and second insulated wires, 12 and 14, respectively (FIG. 2). The sealing sleeve 10 is a one-piece molded article comprising a length of elastomeric tubing generally indicated at 16 and having first and second ends generally indicated at 18 and 20, an outside surface 22 of uniform diameter, an internal cavity 24 centrally located between the first and second ends 18 and 20, a plurality of sealing baffles 26 adjacent each of the first and second ends, and a pair of internal cylindrical sections 28 located between the central cavity 24 and the sealing baffles 26.

The elastomeric tubing 16 is preferably molded from a neoprene compound having the physical properties listed in Table 1.

TABLE 1

| SPECIFICATIONS OF PHYSICAL PROPERTIES FOR ELASTOMERIC NEOPRENE COMPOUND | | |
|---|---|---|
| PROPERTY | TEST METHOD | REQUIREMENT |
| COLOR | FED STD 595 | BLACK 37038 |
| HARDNESS | ASTM D2240 | A60 ± 5 |
| TENSILE | ASTM D412 | 2300 PSI MIN |
| ELONGATION | ASTM D412 | 500% MIN |
| TEAR | ASTM D624 | 'B' 200 PL MIN |
| COMPRESSION SET | ASTM D395 22 HRS @ 257° F. 22 HRS @ 160° F. | 'B' 30 MAX 'B' 25 MAX |
| INSULATION RESISTANCE | ASTM D257 | $10^6$ MEGOHMS MIN |
| ARC RESISTANCE | ASTM D495 | 115 SEC MIN |

Alternatively, the elastomeric tubing can be molded from a clear silicone compound, or another type of clear or see-through elastomer having similar physical properties.

The sealing sleeve 10 is intended to be used in connection with a butt wire splice generally indicated at 30 (FIG. 2) per MIL-S-81824 or the equivalent thereof. The butt wire splice 30 and the sealing sleeve 10 are used to splice together and seal various sizes of insulated wires. The range of sizes of wire that can be used with the sealing sleeve 10 depends on the wire sizes specified for the particular type and size of butt wire splice 30. The two wires which are to be spliced need not be the same size so long as they are within the range specified for the butt wire splice.

Figure 3:
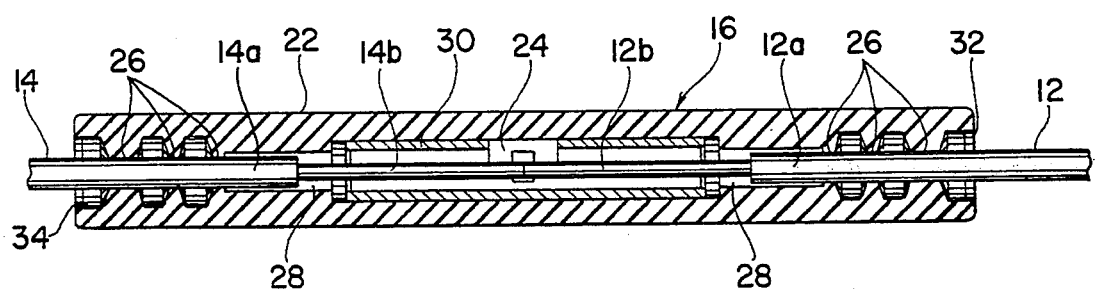
FIG. 3 is another cross sectional view with the butt wire spliced connection enclosed within the sealing sleeve.

Referring now to FIGS. 2 and 3, the sealing sleeve 10 is installed in the following manner to hydrostatically seal a butt wire spliced connection. Both internal ends, 32 and 34, of the sealing sleeve should be lubricated with a silicone gel compound (not shown) such as MIL-S-8660 or an equivalent. The first end of the sealing sleeve 18 is slid over the end of the first insulated wire 12 that is going to spliced onto the butt wire splice 30. The insulation on the ends of the first and second wires, 12 and 14, should be removed on the portions 12a and 14a that are fitted into the butt splice 30. The stripped ends 12b and 14b of the first and second wires 12 and 14 are then inserted into the butt wire splice 30 and crimped using a commercially available crimping tool. The sealing sleeve 10 is then slid over the crimped butt wire splice so that it is enclosed within the central cavity 24 of the sleeve (see FIG. 3). As the sealing sleeve 10 is slid over the crimped splice, the silicone gel contained in the internal ends of the sleeve lubricates the insulated wires and splice for easier movement through the sleeve. The sealing baffles 26 and the internal cylindrical sections 28 of the sealing sleeve 10 expand to accommodate the insulated wires and the crimped butt wire splice as they slide therethrough. Once the crimped splice 30 is positioned in the internal cavity 24, the sealing baffles 26 compress onto the outer periphery of the insulated portions 12a and 14a of wires 12 and 14 to create a high pressure water tight seal. The internal cylindrical sections 28 of the sleeve 10 provide clearance for any stripped portions of wire that extend beyond the ends of the butt splice 30. These internal sections 28 ensure that the internal sealing baffles 26 at both ends of the sleeve 10 are positioned over and compress onto the insulated portions of the wires. When the butt wire splice 30 is properly positioned in the central cavity 24, the sealing sleeve 10 has a uniform outer diameter throughout it's entire length and the outer diameter of the installed sealing sleeve is only slightly larger than that of the wires being spliced. Therefore, it can be appreciated that proper positioning of the crimped butt wire splice 30 can be easily verified either by feel or by visual inspection. The sealing sleeve of the instant invention 10 has been found to be effective to a seawater hydrostatic pressure of 1500 psig.

It is seen therefore that the sealing sleeve of the instant invention 10 provides a means for quickly obtaining a small diameter, high pressure hydrostatically sealed spliced connection similar to that obtained with heat shrink tubing. The instant sealing sleeve 10 provides a distinct advantage over heat shrinkable tubing in that wire splicing and sealing operations can be performed in remote areas where a heat gun or heat producing device cannot be used, such as in underwater applications and in areas where flammable vapors are present. The sealing sleeve 10 is relatively inexpensive compared to the mateable boots and heat shrinkable tubing, and is reusable, and therefore provides a more cost effective means for sealing spliced connections in applications where mateable boots or heat shrink tubing would normally be used repeatedly. For these reasons, it is believed that the sealing sleeve of the instant invention represents a significant advancement in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A one piece sealing sleeve for hydrostatically sealing a butt wire spliced connection between first and second insulated wires, said sealing sleeve comprising:

a length of heat stable elastomeric tubing having first and second ends;

a predetermined outside diameter;

an internal cavity centrally located between said first and second ends for housing said butt wire spliced connection of said first and second wires; and at least one internal hydrostatic sealing baffle positioned adjacent each of said first and second ends, said butt wire spliced connection resting in said internal cavity and said hydrostatic sealing baffles compressing against an outer periphery of said insulated wires to form a hydrostatic seal therewith, said tubing substantially maintaining said predetermined outside diameter when said butt wire spliced connection is received in said internal cavity.

2. In the sealing sleeve of claim 1, said elastomeric tubing comprising a neoprene compound.

3. In the sealing sleeve of claim 1, said elastomeric tubing comprising a clear silicone compound.

4. In the sealing sleeve of claim 1, said elastomeric tubing further having internal cylindrical sections positioned between said internal cavity and said sealing baffles.

* * * * *